(Model.)

E. D. WARREN.
Hide and Pelt Working Machine.

No. 241,171. Patented May 10, 1881.

Attest:
Courtney A. Cooper
William Paxton

Inventor:
E. D. Warren
By his attorney
Charles E. Foster

UNITED STATES PATENT OFFICE.

EDMUND D. WARREN, OF WOBURN, MASSACHUSETTS.

HIDE AND PELT WORKING MACHINE.

SPECIFICATION forming part of Letters Patent No. 241,171, dated May 10, 1881.

Application filed November 9, 1880. (Model.)

*To all whom it may concern:*

Be it known that I, EDMUND D. WARREN, of Woburn, Middlesex county, Massachusetts, have invented certain Improvements in Hide and Pelt Working Machines, of which the following is the specification.

The object of my invention is a machine for operating upon pelts, hides, furs, and skins, constructed, as fully described hereinafter, so as by the use of comparatively small tools to operate upon the entire surface of the skin to secure the requisite pressure without danger of injury to any part, and to avoid the necessity of further attendance than is necessary to apply and remove the skins.

Figure 1:
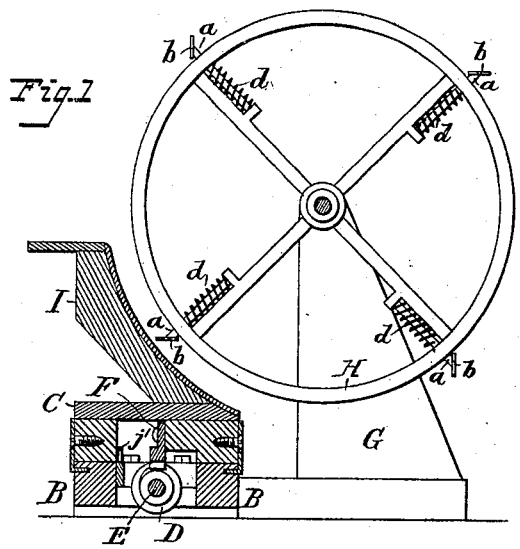
Figure 2:
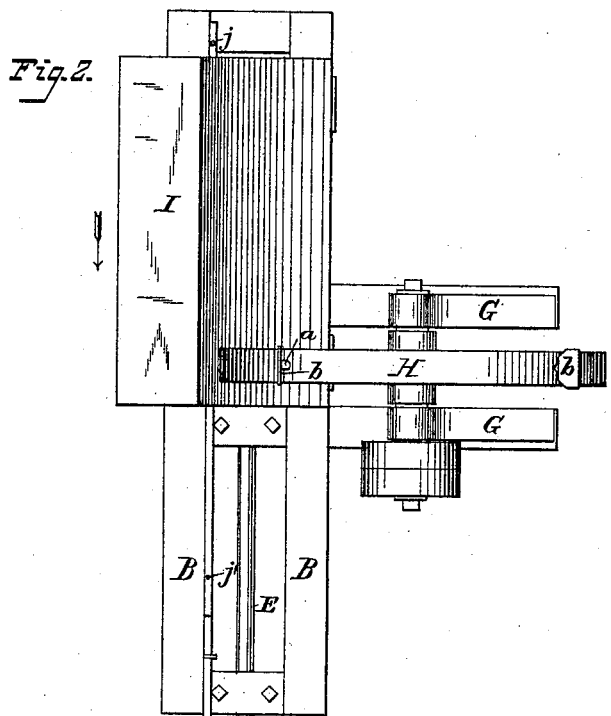

In the drawings, Figure 1 is a sectional elevation of my improved machine. Fig. 2 is a plan view.

The base A supports two guide-rails, B B, on which moves a carriage, C, driven by a worm, D, on a shaft, E, which worm meshes with a rack, F, at the under side of the carriage.

At one side of the rails B B, between standards G G, turns a wheel, H, carrying a series of radial rods, $a$, suitably guided, provided at the outer ends with scrapers, combs, or other tools, $b$, of the construction necessary to secure the desired result, a spring, $d$, being coiled round each spindle and fastened thereto at one end and to the wheel at the other.

The carriage C has a curved bed, I, across which is stretched a rubber apron or sheet, $e$, secured along the upper and lower edges, and lying in contact with the bed and coinciding therewith.

The shaft E carries two pulleys, $f f'$, and an intermediate idler-pulley, $f^2$, and a straight band, $g$, and cross-band $g'$ pass between guides $i\ i\ i$ on a bar, J, sliding in bearings in the guide-rails, the said bar being provided with pins $j j'$, arranged to be struck as the carriage approaches the end of each movement, thereby moving the bar J and shifting the belts so as to reverse the rotation of the shaft and the movement of the carriage.

The wheel H is driven by a belt passing to a pulley on the shaft of the wheel, and the tools $b$ are thereby brought successively upon the skin, which has been placed upon the elastic apron $e$. As each tool strikes the skin it forces the latter close back against the sheet, which yields slightly, but only at the point opposite the tool, so that an intimate contact of the tool with the skin is insured, yet without any such liability to injure the skin as in passing a tool over the same upon a solid bearing.

To insure an easy action the tool-shaft is capable of a slight rocking motion, sufficient to permit the tool to accommodate itself to irregularities in the material operated on, the spring $d$ restoring the tool to its position parallel to the wheel-shaft when the obstruction has been passed.

When the machine is used for working hides the tools consist each of a blade set at such an angle to the rod or spindle $a$ that the skin will be thoroughly scraped, with an action similar to that in hand-scraping, thus thoroughly removing the hair, while the pressure of the edge upon the hide works out the lime and fine hair. As the tools follow each other in quick succession, the portion of skin operated on is quickly brought to the required condition, the feeding of the carriage subjecting the entire skin in a short time to the action of the tools.

It will be seen that, with the exception of placing on and removing the skins, the operations are all performed mechanically, the carriage moving the skin back and forth before the tools so long as it remains in position. It will further be apparent that there is little chance of injuring the skins, and that the operations are performed with rapidity and uniformity.

I claim—

1. The combination, in a machine for operating on pelts, &c., of a reciprocating carriage provided with a curved bed and a revolving wheel arranged at right angles to said carriage, and provided with peripheral tools, substantially as set forth.

2. The combination of the wheel H, reciprocating carriage C, its rack F, the shaft E, worm D, and fixed and idler pulleys $f f' f^2$, and bar J, its pins $j j'$, and guides for directing the belts, substantially as set forth.

3. The combination, with the wheel H, of its tools, carriage C, having a rigid curved bed and elastic apron *e*, covering the face of the said bed, and devices for reciprocating the carriage, substantially as set forth.

4. The combination, with the wheel H, of the radial tool-spindles *a* and springs *d*, connected each to the wheel and to one of the spindles, to permit a limited rotation of the latter, substantially as and for the purpose set forth.

In testimony whereof I have signed my name to this specification in the presence of two subscribing witnesses.

EDMUND D. WARREN.

Witnesses:
WILLIAM E. SKILTON,
BENJAMIN E. BAND.